United States Patent Office 3,346,963
Patented Oct. 17, 1967

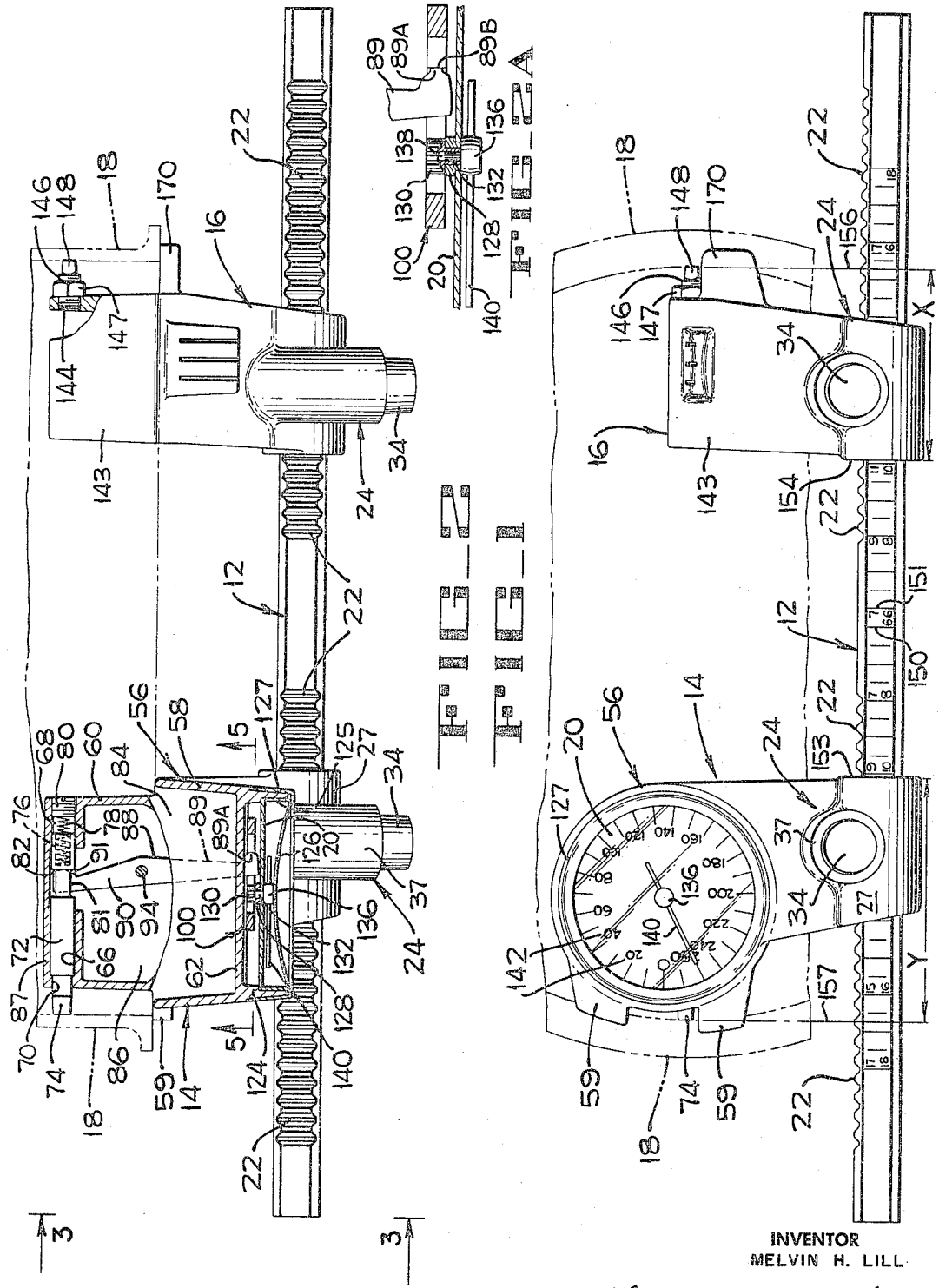

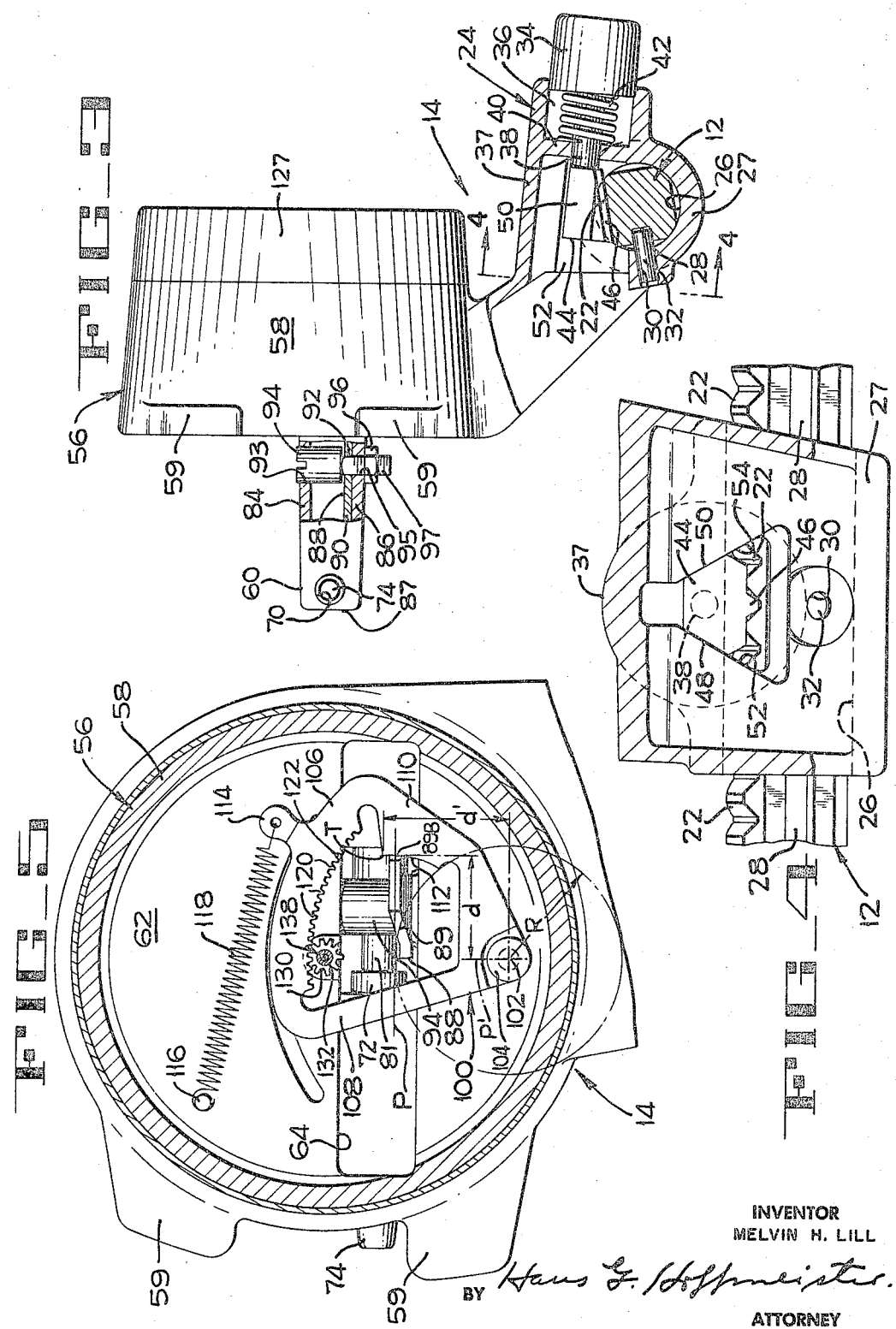

3,346,963
GAUGE
Melvin H. Lill, Okemos, Mich., assignor to FMC Corporation, San Jose, Calif., a corporation of Delaware
Filed Apr. 5, 1965, Ser. No. 445,363
5 Claims. (Cl. 33—147)

ABSTRACT OF THE DISCLOSURE

The needle of a dial indicator is coupled to a depressible measuring plunger by a pivotally mounted lever movable in one plane and reacting against a concave involute cam surface formed on a gear segment which is pivotable in another plane and is meshed with a pinion connected to the needle. The housing of the dial indicator is adjustably locked axially on a notched mounting bar by a push button-actuated and spring biased, toothed wedge-shaped member which is movable across the bar and reacts against the housing and the bar to lock the tooth into a selected notch.

This invention pertains to measuring devices and more particularly concerns a device for determining the internal diameter of a cylindrical object such as a brake drum.

After applying new brake linings to the brake shoes of a typical automotive brake system, the drum engaging surface of the linings must be made to conform to an arc of a circle whose diameter is substantially equal to the internal diameter of the brake drum with which the linings are to be used. Quite frequently, when overhauling the entire automotive brake system, the internal surfaces of the brake drums are ground or honed to present fresh, smooth, unmarked drum surfaces. By making new surfaces, the internal diameter of the brake drum is increased. The new diameter must be measured in order to prepare new linings with the proper curvature.

One type of brake drum diameter gauge that has been developed uses a simple rack and pinion type indicating mechanism to indicate how much deviation from a fixed standard the internal diameter actually is. A pointer which sweeps over the indicating dial is attached to the pinion. Since the permissible deviation is relatively small, the pinion used must be quite small in order to give large deflections representative of a small amount of linear movement of the rack. It has been found somewhat difficult to manufacture small pinions and racks which give the required accuracy.

Most prior art brake drum measuring devices include a measuring instrument slidably mounted on a bar. The measuring instrument is adjustably positioned along the bar according to the nominal or standard size of the drum to be measured. In addition, some brake drum measuring devices have a feeler pin adjustably secured to the mounting bar near the end opposite from the measuring device. The adjusting of these items along the bar has usually been accomplished by threading a locking member into and out of a series of spaced apart holes provided in the bar. It has been found that this is awkward and difficult, especially when the operator's hands are greasy.

The brake drum measuring apparatus of the present invention is provided with a dial indicator having a needle coupled to a depressible measuring plunger by gear, spring, cam and linkage means which compensate for backlash by preloading the coupling in one actuating direction. Machining operations are minimized by incorporating a cast or molded gear segment and camming surface, and an advantage is achieved in cost and assembly time by utilizing fewer and less costly parts than some comparable gauges. Thus, the plunger and dial needle are interconnected by a pivotally mounted lever movable in one plane and reacting against a concave involute surface of the cam, which together with the gear segment is pivotable in another plane normal to the axis of a pinion that is meshed with the gear segment and is connected to the needle. The housing of the dial indicator is adjustably locked axially on a notched mounting bar by a toothed, wedge-shaped member that is movable across the bar and reacts against the housing of the dial indicator with a wedge action to positively lock the tooth into the selected notch and prevent movement of the housing either around or along the mounting bar.

FIGURE 1 is a front elevation of the brake drum measuring apparatus of the present invention.

FIGURE 2 is a plan, partially in cross-section, of the gauge of the present invention.

FIGURE 2A is an enlarged portion of FIG. 2.

FIGURE 3 is an end elevation, partially in cross-section, taken along line 3—3 of FIG. 2.

FIGURE 4 is an enlarged section taken along line 4—4 of FIGURE 3.

FIGURE 5 is an enlarged section taken along line 5—5 of FIG. 2.

The apparatus of the present invention is shown in FIGURE 1 as comprising a mounting bar 12 upon which an indicator unit 14 and a contact point support member or tailpiece 16 are adjustably secured. The entire apparatus is illustrated as being in operating position on a typical brake drum 18 shown partially in phantom lines.

The present gauge may be used to check the internal diameter of any of a multiplicity of so called standard or nominal size brake drums. A standard size brake drum is a drum furnished by the original manufacturer with an internal diameter having a known nominal value or size. It is the deviation from the nominal size that the present invention measures and displays on a dial 20 which is part of the indicator unit 14.

The mounting bar 12 is provided with two sets of transversely extending V-shaped indexing notches or grooves 22. The center-to-center spacing between the notches of a set is a fixed distance corresponding to the difference in diameters of standard size brake drums. Typical center-to-center spacing in one embodiment of the present invention is one quarter of an inch.

The indicator 14 and tailpiece 16 are each provided with a locking mechanism 24, clearly illustrated in FIGURES 3 and 4, which are arranged to hold the members 14 and 16 in selected positions on the mounting bar 12 but can be released to permit the members 14 and 16 to be indexed to other positions on the bar. Since each locking mechanism is identical to the other, only the mechanism associated with the indicator 14 is fully illustrated in FIGURES 3 and 4. It is to be understood that the following description also describes the mechanism 24 associated with the tailpiece 16.

As shown in FIGURE 3, a bore or opening 26 is provided in a lower tubular portion 27 of the indicator 14. Another opening 30 extends through a wall of portion 27 into the opening 26 in which the bar 12 is slidably received. One side of the bar 12 is provided with a longitudinally extending slot 28. A keying pin 32 is press fitted into opening 30 and extends radially inward into the slot 28 where it thus engages the bar 12 to prevent rotation of the indicator 14 with respect to the bar but permits free sliding of the indicator 14 axially along the bar 12.

The locking mechanism 24 includes means for releasably securing the indicator 14 to the bar 12 at various desired positions therealong. As shown in FIGURE 3, a push button receiving opening or chamber 36 is formed in the indicator in a tubular portion 37 that is transverse to and intersects tubular portion 27. A manually operated push button 34 is slidably disposed within chamber 36 and extends outwardly therefrom. An actuating rod 38 is attached to the inward side of push button 34 and extends through a hole provided in a wall 40 at the rear of chamber 36. A compression spring 42 is mounted over the rod 38 between wall 40 and pushbutton 34, thereby biasing the push button outwardly of the chamber 36.

On the extreme rearward end of the rod 38 there is threadedly mounted a locking wedge 44. The locking wedge 44 is disposed directly above the surface or side of bar 12 upon which are located the notches 22. It is to be noted however, that the notches are angularly related to the direction of movement of rod 38. In addition, the lower portion of wedge 44 extends at an angle to the direction of movement of rod 38 and is generally parallel with the direction of notches 22. The lower portion of the wedge 44 is provided with a notch engaging protrusion or tooth 46. The tooth 46 is shaped to wedge snugly within any one notch 22. Since the tooth 46 and notches 22 are offset with respect to the direction of the path of travel of rod 38 and wedge 44, the tooth 46 is normally snugly engaged with the sloped sides of a notch 22 by means of the biasing force of compression spring 42.

In FIGURE 4, there is shown a cross-section of the locking mechanism 24 and wedge 44 is particularly shown as being in engagement with a notch 22 of bar 12. It is to be noted that the upper portion of the wedge 44 is formed with sloping side walls 48 and 50. In addition, the tubular portion 37 of the indicator 14 is provided with sloping side walls 52 and 54 which slope at the same angle and face the respective wedge side walls 48 and 50. When the pushbutton 34 is released and the tooth 46 is wedged into a notch 22, the wedge 44 is lifted or urged upward so as to be wedged firmly against the walls 48 and 50. It can thus be seen that wedge 44 provides means for normally securing the indicator 14 in a fixed position along the bar 12 and prohibits axial movement therealong.

In order to place the indicator 14 in a different position along the bar 12, it is only necessary to press the pushbutton 34 inwardly, thereby causing tooth 46 to be moved out of its associated notch 22, slide the indicator 14 along the bar 12 while holding the pushbutton pressed in, and then release the pushbutton when the new position along the bar is reached. The tooth 46 will thus be wedged into a new notch 22 and the indicator is thus secured in a new position.

As previously mentioned, the tailpiece 16 is provided with a locking mechanism identical to that heretofore described and illustrated for securely positioning the tailpiece 16 at a desired location along the bar 12.

A housing 56 is formed at the upper part of the indicator 14, as illustrated in FIGURES 1 and 2. The housing 56 comprises essentially two distinct portions; a forwardly disposed cylindrical gear and dial housing 58 (FIG. 3) and a rearwardly disposed, slender, box-shaped feeler pin and lever housing 60.

A rearward wall or floor 62 (FIG. 2) disposed at the lower end of gear and dial housing 56, is provided with a restangular opening 64 (FIG. 5) which opens into the rearwardly extending pin and lever housing 60. Two flat positioning tabs 59 are formed on the exterior of housing 58 and extend outwardly therefrom.

Cylindrical pin holding chambers 66 and 68 (FIG. 2) in axial alignment with each other and extending parallel with the axis of the bar 12, are provided at the rear end of lever housing 60. A counterbore 70 having a diameter somewhat less than the diameter of chamber 66 extends from the chamber 66 to the exterior of housing 60 in axial alignment therewith. The chamber 68 extends to the exterior of housing 60 on the side opposite from where counterbore 70 opens and is provided with internal threads extending a short distance inwardly from its end opening.

A cylindrical shaped plunger member 72 is slidably disposed in chambers 66 and 68. A drum-contacting movable pin or contact point 74, having a diameter substantially equal to the diameter of counterbore 70, is integral with plunger 72 and extends outwardly thorugh the counterbore 70. A spring-receiving bore 76 is formed in the portion of plunger 72 that is generally contained within chamber 68 and opens outwardly toward the chamber's threaded end.

A coiled compression spring 78 is disposed within bore 76 and extends a short distance outwardly thereof. An externally threaded adjusting plug 80 is screwed a predetermined distance into the threaded end of chamber 68 and abuts the end of spring 78. The spring 78 reacts against the plunger 72 and forces or biases plunger 72 toward the bore 70. However, since the portion of plunger 72 in chamber 66 is greater in diameter than bore 70, the plunger 72 is maintained or stopped in an extreme lefthand position against the lefthand wall of bore 66 with a force determined by the spring constant and amount of pre-compression of spring 78. The outer end of pin 74 is thus yieldably biased a certain distance outwardly of housing 60.

The plunger 72 is formed with an external circumferential groove 81 having a lever contacting wall or surface 82 disposed approximately midway its length and facing axially toward the pin 74. The function of wall 82 will be fully described hereinafter.

Rearwardly extending upper and lower walls 84 and 86 (FIG. 3) of the lever housing 60 are provided with aligned openings 93 and 95 located approximately midway between the rear wall 87 of the housing 60 and the internal wall 62.

An actuating lever 88, having a mounting hole formed therein, is disposed within the housing 60 such that its mounting hole is in line with openings 93 and 95 (FIG. 3) of the walls 84 and 86. The lever 88 has a forward arm 89, and a rearward arm 90 which rests in sliding relation on the interior surface of the lower wall 86 of the lever housing 60. The outer end of arm 90 is provided with a curved wall-contacting segment 91 which extends into groove 81 and faces lever contacting surface 82 of plunger member 72, while the forward arm 89 of the lever has a projecting pad 89A (FIG. 2A) which is provided with a slightly rounded or segmental spherical lever-contacting surface 89B.

A shouldered screw 94 (FIG. 3) has a head disposed in an open 93 in upper wall 84, and a reduced diameter shank 97 that extends through an opening 92 in lever 88 and an opening 95 in bottom wall 86. A nut 96 is screwed onto the threaded end 97 and against the exterior surface of wall 86 thereby maintaining the lever 88 in operating position.

The forward arm 89 (FIG. 2) of lever 88 extends forwardly through the opening 64 of wall 62 and into the gear and dial housing 58.

Since spring 78 biases the plunger 72 in the lefthand direction as viewed in FIGURE 2, the contacting surface 82 bears against segment 91 and biases lever 88 in the counterclockwise direction.

As illustrated in FIGURE 5, a generally triangular shaped actuating plate 100 is pivotally mounted at its apex to the transverse wall or floor 62 by means of a pin 104 for pivotal movement about the axis 102 of pin 104 in a plane transverse to the plane of movement of the lever 88. The pin 104 has a first reduced diameter portion on which the plate 100 is rotatably journalled and a further reduced shank that is disposed with a press fit in wall 62.

The actuating plate 100 has a base portion or side 106 located directly opposite apex 102 and on the side of opening 64 opposite the location of pivot mounting screw 104.

The central portion of plate 100 is open, thereby forming legs 108 and 110 which join the apex 102 to the opposite ends of a base portion 106.

The interior side of leg 110 is formed with a compound surface including an arcuate or curved lever arm contacting an involute surface or cam 112. It will be noted in FIG. 5 that the end of lever 88 moves generally in a plane P. The involute surface 112 is designed according to conventional practice so that throughout the pivoting range of the sector plate 100, there will be a portion of the involute surface in contact with the rounded surface 89B of lever 88. In one arrangement, where plane P was 0.660" from the axis 102 of pivot pin 104, and where the initial position of the contact surface 89B (corresponding to the fully extended position of the movable contact point 74) was a distance $d$ equal to approximately 0.594" from a plane P' passing through the axis of pin 104, and the sector plate pivoted through a range of approximately 32°, a base circle for the involute surface had a center on axis 102, a radius R of 0.660", and a point T at one end of the involute surface was at distance $d$ from the plane of the axis of pin 104 and at a distance $d'$ of 0.7439" above (FIG. 5) the pin axis.

A spring attaching arm 114 is formed on the outer side of base 106. An upstanding spring attaching post 116 is suitably formed on floor 62 a considerable distance away, in the counterclockwise direction, from the arm 114. A coiled tension spring 118 is stretched between post 116 and arm 114. Spring 118 thus tends to pull or pivot the plate 100 in the counterclockwise direction about screw 104, whereby the involute surface 112 is urged into intimate contact with the surface 89B of lever arm 88. However, the force or tension of spring 118 is preset such that the counterclockwise force of surface 112 against surface 89B is less than the force exerted by surface 89B against surface 112 due to the action of spring 78 acting on the movable contact point. When the force of spring 78 is overcome by pressing movable contact point 74 inwardly, the lever 88 is free to move clockwise (as viewed in FIGURE 2). The force of spring 118 then causes the plate 100 to move counterclockwise (FIG. 5) and thus keep surfaces 89B and 112 in intimate contact with each other.

It is to be noted that as plate 100 moves from its full clockwise position shown in FIGURE 5 to its full counterclockwise position, successively lower portions or points of surface 112 are brought into contact with surface 89B of lever 88. It can thus be seen and readily understood that as the lever 88 moves clockwise through its full operational range, the number of angular degrees through which it is rotated is a function of the linear displacement of contact point 74 inwardly of housing 60.

One immediate advantage of the involute surface 112 and the tangentially disposed outer arm 89 is that the force of spring 118 is at all times transmitted to the arm 89 along a line coincident with the plane of movement of the arm 89. There is thus no component of force tending to bind or bend the arm 89 upwards or downwards from its normal position.

The curved inner edge of base portion 106 is provided with a plurality of gear engaging teeth 120, thereby forming a curved rack 122.

As shown in FIGURES 1 and 2, the dial 20 is disposed within the dial housing 58 against a segmental circular supporting ledge 124 and held therein by a circular retainer ring 125. A concave circular cover 126 lies in front of the dial 20 having its peripheral edge locked between the edge of retainer ring 125 and an inturned annular flange of a generally frusto-conical cap 127. The center of dial 20 (FIG. 2A) is provided with a small opening, and a bushing 128 is press fitted into this opening. A pinion 130, having an axially extending tubular shaft 132 is disposed such that the shaft 132 extends into the bushing 128 and is rotatable therein about its longitudinal axis. A shaft 138 that projects outwardly from the center of a cylindrical hub 136, extends into the tubular shaft 132 of the pinion and has a knurled portion snugly engaging the internal wall of the tubular shaft 132 in driving relation. A pointer 140 is secured within a transversely extending opening provided in the hub 136 so that, when the pinion 130 is rotated, the pointer moves in a circular path over the dial 20.

The pinion 130 intermeshes with the teeth 120 of the curved rack 122. With the arrangement as shown, the full range of pivoting of actuating plate 100 is approximately 32°. The size of pinion 130 is such that, as actuating plate 100 pivots through approximately 32°, the pinion is caused to make slightly less than one complete revolution. It is to be noted that, in order to cause the actuating plate to move approximately 32° in the counterclockwise direction, the plunger 72 must be pressed inwardly of chambers 66 and 68 for approximately one-quarter inch.

As the pinion is rotated, the pointer 140 is rotated about the center of the plate 20. Near the outer edge of the dial 20 there is suitably imprinted a series of radially extending markings or numerals 142 disposed in a circular pattern around the axis of the dial. The markings are equispaced and the angular distance between adjacent numerals represents a particular amount of linear displacement of plunger 72, namely, 0.010 inch of movement of plunger 72. Thus, if the pointer 140 is originally set at the 250 mark and the plunger 72 is moved inwardly of the housing exactly one-quarter of an inch (0.250"), the pointer will swing counterclockwise to the zero mark. Conversely, if the pointer 140 moves from zero to mark 20, for example, the plunger 72 will move 0.020 inch.

The tail piece 16 is provided with a box-like rear portion 143 (FIG. 2) one wall of which has an internally threaded opening 144 that is axially aligned with the plunger 72. An externally threaded adjustable feeler pin or member 146 is screwed part way into the opening 144. The outer end of feeler pin 146 is formed with a drum contacting point 148. The pin 146 may be axially adjusted in opening 144 and then retained in its adjusted position by means of a locking nut 147.

The support bar 12 is calibrated along its length in one inch increments, the calibrations beginning on opposite sides of a one-quarter inch central zone defined by two spaced marks 150 and 161. On the upper edge of the bar the numbers to the left (FIG. 1) of the mark 150 are 7, 9, 11, 13, 15 and 17, and on the lower edge the numbers are 8, 10, 12, 14, 16 and 18, the mark 150 bearing the number 6. To the right of the mark 151, the numbers on the upper edge of the bar are 9, 11, 13, 15 and 17, mark 151 having the number 7. On the lower edge, to the right of mark 151 which bears the number 6, the numbers are 8, 10, 12, 14, 16 and 18. The inner edge 153 of the indicator 20 and the inner edge 154 of the tailpiece 16 are used as reference edges which cooperate with the markings on the rod to indicate the normal inner diameter of the drum being measured. For example, the setting shown in FIG. 1 is for the checking of a drum that originally had an internal diameter of 10 inches. To obtain this setting, both reference edges 153 and 154 were placed adjacent the number 10 on the rod. If a 7 inch drum is to be checked, each of the reference edges would be placed adjacent a number 7 on the rod.

It will therefore be seen that the tailpiece 16 is so constructed that the distance X (FIG. 1) from the reference edge 154 to a plane 156 coinciding with the end plane of fixed contact member 148 is a predetermined distance, and the distance Y from the reference edge 153 to a plane 157, that coincides with the end plane of the movable contact point 74 when the point is in the outermost position schown in FIG. 1, is a predetermined distance. When the distances X and Y are added to the distance between the reference edges 153 and 154, the total distance will be one-quarter inch greater than the distance indicated by the setting of the gauge. Thus, in FIG. 1, although a setting of ten inches is indicated on the bar, the distance between the end of fixed contact point 148 and the end of the normally extended movable point 74 is ten and one-quarter inches. When the movable point 74 is in the extended position, the pointer 140 is at the 250 mark, as shown in FIG. 1. Accordingly, if the drum to be measured has an internal diameter of exactly ten inches, the movable contact point 74 will be depressed one-quarter inch and the pointer will be moved to the zero mark. If the diameter of the drum is greater than ten inches, the movable contact point will not be depressed for a full one-quarter inch, and the amount of movement less than one-quarter inch will be recorded on the dial by the position of the pointer. Thus, if the pointer stopped at the 20 mark, the movement of the plunger would have stopped 0.020″ short of a full one-quarter inch an, accordingly, the diameter of the drum would be indicated to be 0.020″ oversize, or 10.020.″

It will be noted in FIG. 1 that the drum shown would be one that is 0.250″ oversize since the plunger is fully extended.

To operate the gauge of the present invention, the tailpiece 16 and the indicator 14 are first suitably positioned along the bar 12 at points corresponding to the nominal or standard size of the brake drum 18 to be measured. Such positioning is accomplished by pressing in the pushbuttons 34 and sliding the tailpiece 16 and gauge 14 along the bar 12 to predetermined points whereby when the pushbuttons are released their respective locking wedges 44 are in position over a particular notch 22 corresponding to a particular standard size brake drum. The pushbuttons are then released, thereby securing the tailpiece and indicator in the predetermined positions. The gauge is then placed in operative position in the drum by depressing the movable contact point 74 a distance sufficient to permit both contact points 74 and 148 to be moved into the drum. To properly position the gauge the planar surfaces of the positioning tabs 59 of the indicator 14 and the planar surface of a positioning tab 170 on tailpiece 16 are seated against the flat circular edge of the drum, it being understood that the surfaces of the tabs 59 and 170 are in the same plane.

When both points are in contact with the inner walls of the drum, the gauge is rocked or oscillated back and forth until the highest reading appears on the dial 20. The amount of oversize of the diameter of the drum can then be read directly as the number of thousandths of an inch indicated by the pointer. For example, if the pointer is opposite the 20 mark, the diameter of the drum is 0.020″ inch oversize.

From the foregoing description it will be seen that the present invention provides a novel wedge type locking device for the movable members of a gauge. In addition the present invention provides a novel calibration means for mounting separate parts of the gauge in precisely spaced relation, a novel indicator mechanism which utilizes the advantages of an involute cam surface, and includes a novel concave lens and lens mounting for protecting the dial face of the indicator.

Having thus described the invention, what is claimed as new and for which the protection of Letters Patent is desired is:

1. An apparatus for translating linear motion into angular motion comprising; a housing provided with a cylindrically shaped bore opening outwardly of said housing, a cylindrically shaped plunger slidably disposed in said bore, one end of said plunger extending outwardly of said housing, said plunger being freely slidable in said housing between a first position and a second position, said plunger having a lever engaging surface; first biasing means for yieldably urging said plunger outwardly of said bore, an actuating plate mounted in said housing for pivotal movement about an axis extending normal to the direction of movement of said plunger, said plate being provided with cam surface of arcuate form; second biasing means yieldably urging said plate in one pivoted direction; a lever mounted in said housing for pivotal movement about a second axis extending normal to the direction of movement of said plunger and normal to the pivot axis of said plate, said lever having diametrically opposed arms, one arm of said lever being in confronting relation with said lever engaging surface, the other arm of said lever being in confronting relation with said cam surface; said plunger and said actuating plate being biased respectively by said first and said second arm biasing means against said first arm and said second arm in opposite angular directions, the torque imposed upon said lever from said plunger being greater than the torque imposed upon said lever from said actuating plate; and a pinion mounted in said housing for rotation about an axis parallel with said first axis; said actuating plate being provided with rack means in engagement with said pinion.

2. An apparatus for translating linear motion into angular motion comprising; a housing, a plunger slidably disposed in said housing, one end of said plunger extending outwardly of said housing, said plunger being slidable between a first and a second position, said plunger being provided with a lever arm contacting surface; a lever pivotally mounted in said housing for pivotal movement about a first axis, said lever having a first arm in confronting relation to said contacting surface, said lever further having a second arm, said second arm being movable in a flat plane as said lever arm pivots, an actuating plate mounted in said housing for pivotal movement about a second axis extending parallel with said flat plane and spaced therefrom, said second axis extending normal to said first axis and intersecting therewith, said plate being provided with a cam surface, said cam surface being defined as an involute of a circle having a center on said second axis and a radius substantially equal to the perpendicular distance between said plane and said second axis, said cam surface being concave and confronting said second arm, means for yieldably biasing said actuating plate so that said cam is yieldably biased against said second arm; said biasing means causing said first arm to be releasably engaged with said contacting surface and to follow said contacting surface as said plunger moves between said first and second positions; pinion means disposed in said housing for rotation about a third axis extending parallel to said second axis, and rack means provided on said plate and in engagement with said pinion means for rotating said pinion means as said actuating plate pivots.

3. The apparatus of claim 2 wherein said cam surface is arranged and formed on said actuating plate to extend from a point on said circle to a point a predetermined distance away from said circle.

4. In a gauge; a housing having provided therein an opening extending therethrough; a longitudinally extending bar disposed in said opening and extending outwardly of said opening at both ends thereof; said bar being provided with a longitudinally extending groove opening outward at the exterior surface of said bar; said housing being provided with a lug extending inwardly into said groove for preventing relative rotation between said housing and said bar; said bar being further provided with a plurality of notches spaced axially along said bar, each of said notches extending transversely of said bar, each of said notches being formed by confronting spaced sloping walls; said housing being provided with a wedge receiving chamber opening into said opening, said chamber being formed by confronting sloping walls facing toward said opening; a wedge member movably disposed in said chamber, said wedge member being movable in said chamber transversely of the axis of said bar and into and out of one of said notches; said wedge member having a first pair of sloping walls, respective ones of said first pair of walls extending parallel to respective ones of said walls of said chamber and in confronting relation thereto; said wedge member having a second pair of sloping walls, respective ones of said second pair of walls extending parallel to and in confronting relation with respective ones of said walls of a notch when said wedge is in any one of said notches, means mounted in said housing for normally biasing said wedge means in a direction toward said walls of a notch, and pushbutton means for moving said wedge means outwardly of said chamber and outwardly of a notch.

5. In a brake drum measuring gauge, an elongate mounting bar having a series of transverse notches with bottom portions in a common plane, a housing encircling and slidable along said mounting bar, said housing having two diverging planar wall surfaces transversely related to and spaced from said mounting bar to define a wedge-shaped chamber extending across said mounting bar intermediate said housing and said mounting bar, a wedge member slidably mounted in said housing for linear movement in said chamber transversely of said mounting bar between a locking and unlocking position, said wedge member having side walls slidably engaged with said diverging walls of said housing and a toothed bottom wall which is angularly related to the path of movement of said wedge member and parallel to said common plane, said toothed wall being engaged with a selected notch when said wedge member is in said locking position, and out of engagement with a notch when in said unlocking position to release said housing for selective positioning along said mounting bar, and a spring resiliently urging said wedge member toward said locking position.

References Cited

UNITED STATES PATENTS

| | | | |
|---|---|---|---|
| 703,725 | 7/1902 | Hardinge | 33—172 |
| 769,267 | 9/1904 | Muncaster | 33—147 |
| 917,097 | 4/1909 | Michelsen | 33—172 |
| 1,282,030 | 10/1918 | Benemelis | 33—143 |
| 1,425,193 | 8/1922 | Gates | 33—172 |
| 1,887,220 | 11/1932 | Stuckeman | 33—165 X |
| 2,345,845 | 4/1944 | Wells | 33—172 |
| 2,769,241 | 11/1956 | Barrett | 33—147 |
| 2,984,206 | 5/1961 | Tyler et al. | 116—129 |

SAMUEL S. MATTHEWS, *Primary Examiner.*